United States Patent [19]

Misra et al.

[11] Patent Number: 5,068,819

[45] Date of Patent: Nov. 26, 1991

[54] FLOATING POINT APPARATUS WITH CONCURRENT INPUT/OUTPUT OPERATIONS

[75] Inventors: Mamata Misra; Robert J. Urquhart; Michael T. Vanover; John A. Voltin, all of Austin, Tex.

[73] Assignee: International Business Machines Corporation, Armonk, N.Y.

[21] Appl. No.: 647,183

[22] Filed: Jan. 24, 1991

Related U.S. Application Data

[63] Continuation of Ser. No. 211,387, Jun. 23, 1988, abandoned.

[51] Int. Cl.⁵ ............................................. G06F 7/38
[52] U.S. Cl. .................................... 364/736; 364/748
[58] Field of Search ................ 364/748, 736, 200, 900

[56] References Cited

U.S. PATENT DOCUMENTS

| | | | |
|---|---|---|---|
| 4,025,771 | 5/1977 | Lynch, Jr. et al. | 364/200 |
| 4,270,181 | 5/1981 | Tanakura et al. | 364/736 |
| 4,525,796 | 6/1985 | Omoda et al. | 364/730 |
| 4,589,067 | 5/1986 | Porter et al. | 364/200 |
| 4,712,175 | 12/1987 | Torii et al. | 364/200 |
| 4,725,937 | 2/1988 | Matsuura | 364/736 |

OTHER PUBLICATIONS

Abstract, JP 62-105518, May 16, 1987.
IBM Technical Disclosure Bulletin, vol. 29, No. 7, Dec. 1986, pp. 2903-2906, "Pipelining in Floating-Point Processor".
IMB Technical Disclosure Bulletin, vol. 30, No. 9, Feb. 1988, pp. 315-319, "Pipelining of Floating Point Multiply Unit with Common Input/Output".
IBM Technical Disclosure Bulletin, vol. 24, No. 5, Oct. 1981, pp. 2483-2489, "Accumulator-Based Vector Instructions".

Primary Examiner—Dale M. Shaw
Assistant Examiner—Tan V. Mai
Attorney, Agent, or Firm—Thomas E. Tyson

[57] ABSTRACT

In a data processing system, a method for performing a series of operation sequence results and providing such results including the steps of (1) computing the results for each sequence of operations consecutively and (2) reading the results for the proceeding computations during the computation of a current operation result. This method further includes the use of registers for the temporary storage of the sequence results. During the computation of the operation sequence results, other registers are used in performing the sequence operations. The operations store parameters in a progressive fashion. In other words, the initial operations are performed in one set of registers while the final result from the sequence operation is stored in a different register. The result of a previous operation sequence computation is read from a register that is not being used during the computation of the current sequence operation. Also, included is an interlock capability to prevent the storing of sequence in registers that are concurrently being read.

28 Claims, 8 Drawing Sheets

NON-VECTOR, NON-CONCURRENT FLOW DIAGRAM
INSTRUCTIONS TO IMPLEMENT Y(I) = Y(I) + X(I) * K

FLOATING POINT INSTRUCTIONS OUTSIDE THE LOOP

FLT POINT COPY:    K —> R0

FLOATING POINT INSTRUCTIONS IN THE LOOP

FP MULTIPLY:    R0 * (X(I) —> R1) —> R1
    FP ADD:    R1 + (Y(I) —> R2) —> R2
    FP READ:    R2 —> Y(I)

TABLE I    PRIOR ART

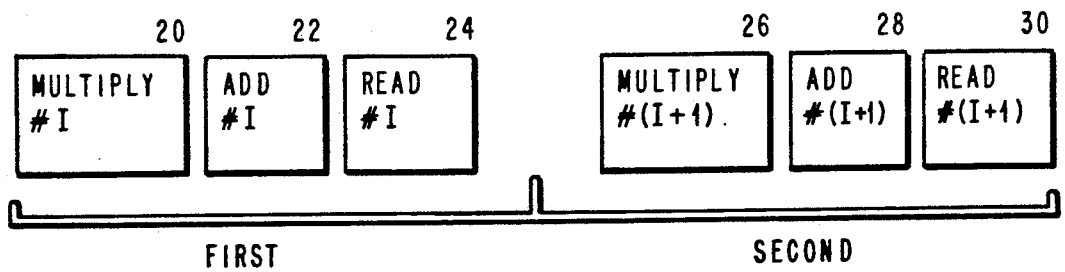

FIG. 2
PRIOR ART

VECTOR CONCURRENT INSTRUCTIONS

FLOATING POINT INSTRUCTIONS BEFORE THE LOOP $$150 \begin{cases} \text{COPY K}: & \text{K} \rightarrow \text{R32} \\ \text{MULT4(I)}: & \text{R32} * (X(I,I+3) \rightarrow R(16,19)) \rightarrow R(20,23) \\ \text{ADD4(I)}: & R(20,23) + (Y(I,I+3) \rightarrow R(24,27)) \rightarrow R(28,31) \end{cases}$$

FLOATING POINT INSTRUCTIONS IN THE LOOP $$156, 162, 168 \begin{cases} \text{MULT4(I)}: & \text{R32} * (X(I,I+3) \rightarrow R(16,19)) \rightarrow R(20,23) \\ \text{READ4(I)}: & R(28,31) \rightarrow Y(I,I+3) \\ \text{ADD4(I)}: & R(20,23) + (Y(I,I+3) \rightarrow R(24,27)) \rightarrow R(28,31) \end{cases}$$

FLOATING POINT INSTRUCTIONS AFTER THE LOOP $$174 \{ \text{READ4(I)}: \quad R(28,31) \rightarrow Y(I,I+3)$$

TABLE II

COPY K INTO R32 BEFORE LOOP
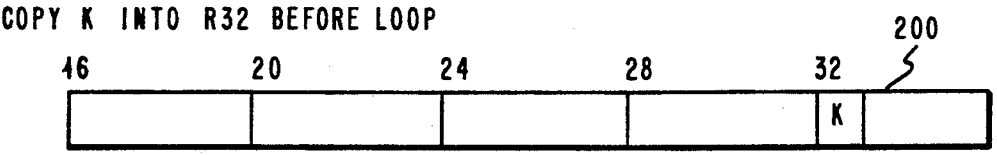
FIRST MULTIPLY (0-3)
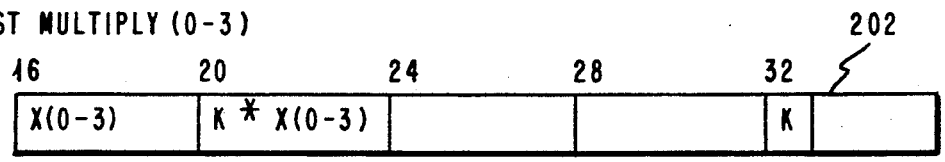
FIRST ADD (0-3)
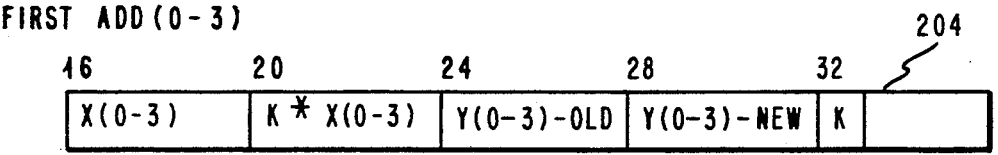
SECOND MULTIPLY (4-7)
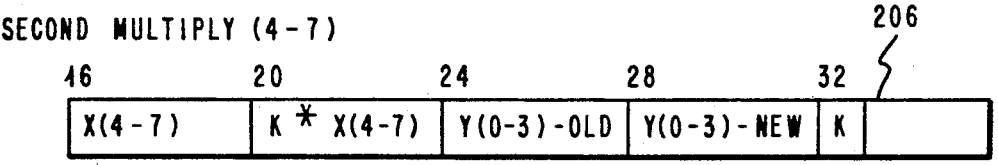
FIRST READ (0-3)
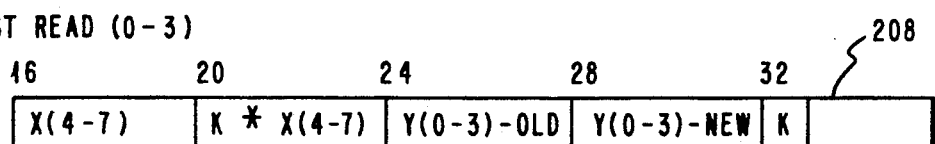
} CONCURRENT OPERATIONS
HARDWARE INTERLOCK (SEE FIGURE 7)
SECOND ADD (4-7)
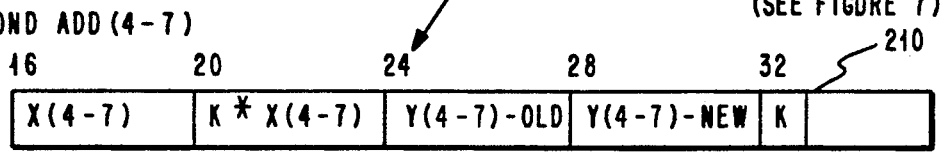
FIG. 6

FLOATING POINT APPARATUS WITH CONCURRENT INPUT/OUTPUT OPERATIONS

This is a continuation of application Ser. No. 07/211,387 filed Jun 23, 2988 now abandoned.

DESCRIPTION

1. Technical Field

The present invention relates to floating point arithmetic computations in a data processing system and more specifically to a floating point apparatus that concurrently provides input/output operations during floating point computations.

2. Background Art

Traditionally, computers perform integer arithmetic. That is, computers perform addition and subtraction of binary integers represented as bits (binary digits). Floating point arithmetic is also performed by computers. Floating point arithmetic parameters include both a mantissa and an exponent. The procedures for performing floating point arithmetic are different and more complex than the procedures for performing integer arithmetic. Due to this complexity, many computers include special purpose hardware to perform floating point arithmetic operations. This hardware is commonly referred to as a floating point unit which is provided separately from the central processing unit (CPU).

In the IBM RT PC workstation, a floating point unit is connected via a bus to the CPU. The CPU, in executing floating point instructions, sends commands over the bus to the floating point unit (FPU) to perform these commands and continues the execution of instructions internally in the CPU while the FPU performs its arithmetic operations.

In scientific and engineering applications, floating point vector arithmetic is important. Therefore, there is a requirement that the FPU have the capability to efficiently perform vector floating point arithmetic. Traditionally, vector processes have been characterized by larger amounts of local memory in which large vector bases of data are stored allowing the vector processor to perform operations without having to interface to a system processor. In this configuration, the bus latency between the system processor and the vector processor is not critical since the ratio of vector processing execution to vector input/output (I/O) time is high.

However, large local memory can be expensive. The present invention attempts to provide a different approach to solve this dilemma by providing the capability to execute FPU arithmetic operations concurrently with FPU I/O operations.

DISCLOSURE OF THE INVENTION

In accordance with the present invention, in a data processing system, a method is provided for performing a series of operation sequences and providing results therefrom where the method includes the steps of (1) computing results from each of the sequence of operations consecutively and (2) reading a result of a proceeding sequence computation during computation of a current sequence operation result. Also provided is a method for computing a series of operation sequences and providing results therefrom which consists of the steps of (1) computing results for each of the sequence of operation consecutively and (2) writing parameters for the next sequence computation during the computation of a current sequence operation result. In this fashion, input and output operations are performed concurrently with the computation operations.

In the preferred embodiment of the present invention, the method further includes the placing of the computation results of the operation sequences in registers. The registers also contain the parameters for the next sequence of operations. In this embodiment, the registers are assigned to store either a result or a parameter and the register assignment is maintained throughout the series computations.

As part of the preferred embodiment of the present invention the computation of operation sequence results is performed on vector arithmetic applications. The vector arithmetic applications are executed in a pipeline fashion. The actual vector arithmetic includes multiplication and addition operations. While these operations are being performed, the registers, which store the results of previous operations are read. Also, during the performance of the current arithmetic operation, the operands for the next arithmetic operations are being provided to these registers. Since several arithmetic operations are being performed in a pipeline fashion and concurrently with each of these pipeline operations, input/output operations are being performed, the speed at which the arithmetic operations and input/output operations are performed is greatly increased.

BRIEF DESCRIPTION OF THE DRAWING

The novel features believed characteristic of the invention are set forth in the appended claims. The invention itself, however, as well as other features and advantages thereof, will be best understood by reference to the following best mode for carrying out the invention, when read in conjunction with the accompanying figures, wherein:

FIG. 2 is a timing block diagram illustrating the prior art operation of a computer performing the arithmetic operation illustrated in FIG. 1A;

FIG. 6 is a diagram illustrating the registers during the performance of the operations illustrated in FIG. 5A;

BEST MODE FOR CARRYING OUT INVENTION

Figure 1:
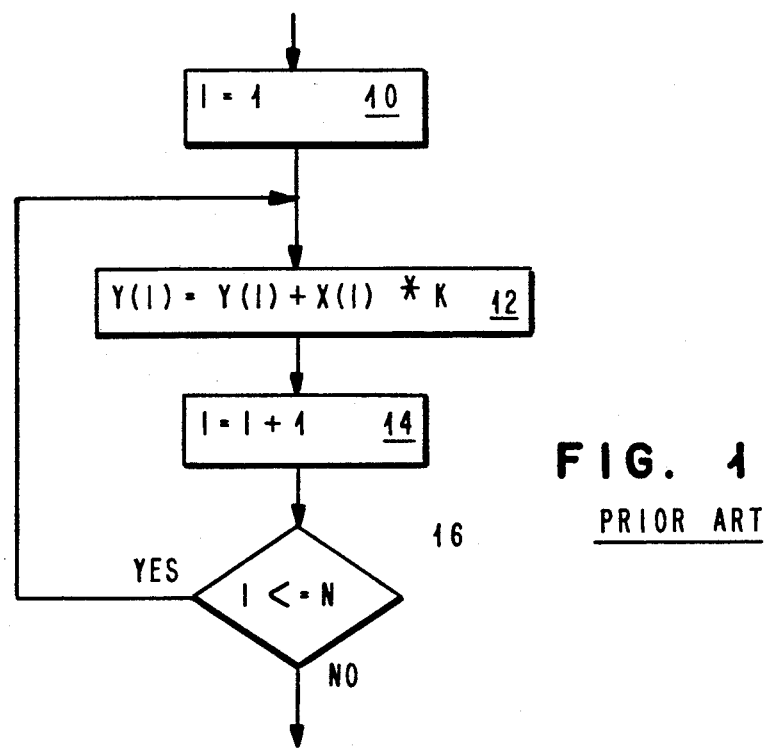
FIG. 1 is a software flow diagram illustrating a prior art nonvector arithmetic computation.

This invention relates to the computation of floating point arithmetic operations. FIG. 1 illustrates a simple loop for performing a floating point arithmetic operation as in the prior art. In Step 10, the loop count is set to 1. In Step 12, Y(I) is set equal to Y(I) plus X(I)*K. In Step 14, the loop count I is incremented. In Step 16, a decision is made as to whether or not I is less than some parameter N which denotes the number of the loop computations. If the I count is less than N the process returns to Step 12. If not, the process is exited.

The actual computer operations performed are illustrated as computer instructions in FIG. 1. First the constant K is placed in register zero (R0). Next the floating point multiplication operation is performed where X(I) is placed in register (R1) and R1 is multiplied by R0 with the result placed in R1. The floating point add is performed by placing Y(I) in register two (R2), adding R2 to R1 and placing the result in R2. Finally, the result of the operation is read by storing the content R2 into Y(I).

FIG. 2 illustrates the traditional prior art timing block diagram having the multiplication operation 20 performed followed by the addition operation 22 and the read operation 24 the loop count I is incremented and the next multiplication operation 26, addition operation 28 and read operation 30 is likewise performed.

Therefore, each of these operations are performed in accordance with their loop count. That is, all operations involving the same parameters (I) occur in consecutive order and the next operands (I+1) are not used until the previous set of operations are finished. In other words, there is no intermixing or overlap of operations between the I operation sequence and the I+1 sequence.

Figure 3:
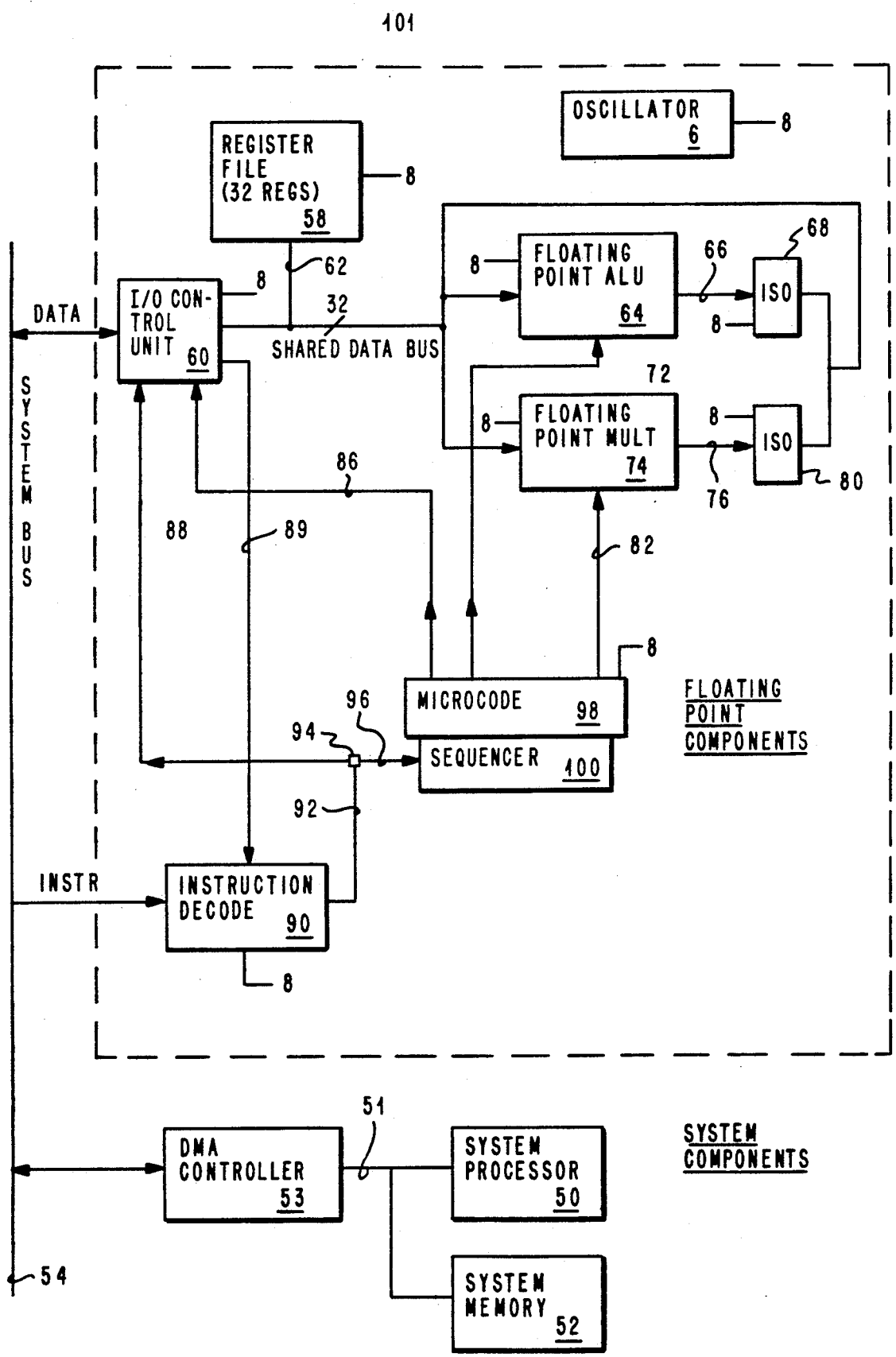
FIG. 3 is a block diagram of the floating point unit of the present invention connected to a system processor.

FIG. 3 illustrates in block diagram for a data processing system including a floating point unit 101 connected by bus 54 to a DMA controller 53 which is, in turn, connected by a bus 51 to system processor 50 and system memory 52. The floating point unit 101 consists of an I/O control unit 60 transfers information between the system processor 50, system memory 52 and the floating point unit 101 over the system bus 54. This data from I/O control unit 60 is provided to the register files 58 and the floating point arithmetic logic unit (ALU) 64 and floating point multiplication unit 74 by bus 62. ALU 64 performs all floating point, integer, and logical operations except for floating point multiply operations. The ALU 64 is configured to be pipelined to handle up to four operations. In other words, in this pipeline mode, four operations will be performed concurrently producing one operation result every cycle. Timing is provided by oscillator 6 over line 8.

The multiply unit 74 performs all floating point multiplication and can be pipelined to handle up to two operations in double precision or four operations in single precision at a time. In the single precision mode, multiplier 74 will provide one result every cycle. In the double precision mode a result will be provided every four cycles. The ALU 64 provides an output on bus 66 to a gating element 68. Likewise, the multiplier 74 provides the result on bus 76 to a gating element 80. Gating element 68 and 88 are connected to bus 62 as shown. Register file 58 is used for the storage of both operand parameters as well as result parameters.

The microcode section 98 and sequencer section 100 control the operation of the floating point unit 101. The sequencer 100 provides an address to access the microcode unit 98. The sequencer 100 is connected to the instruction decode unit 90 which receives instructions by a bus 54 from the system processor 50. These instructions are decoded in the instruction decode unit 90 and provided over bus 92 through gate 94 to bus 96 to the sequencer 100 to select a specific section of microcode for execution. The individual bits in the microcode are used to control the I/O unit 60 by a bus 86, the ALU 64 by a bus 81 and the multiplier 74 by bus 82. The instruction decode unit 90 upon receiving instructions from the system bus 54 separates the instructions into 2 categories. The first category is for sequential instructions that must be executed in a specific consecutive order. The second category is for concurrent instructions which can be executed concurrently meaning that the concurrent instruction can overlap the execution of the sequential instruction in progress.

Figure 4:
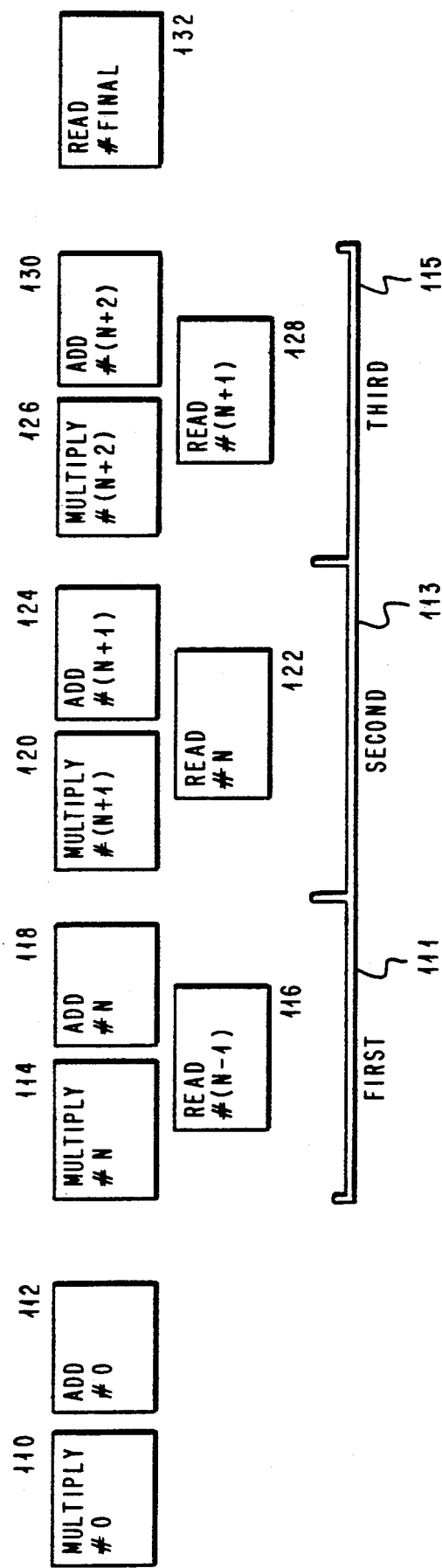
FIG. 4 is a timing block diagram illustrating the concurrent operation of the floating point unit.

FIG. 4 is a timing block diagram illustrating the operation of the present invention in performing a multiple arithmetic sequence (similar to that in FIG. 1A) in a concurrent fashion. Specifically, the multiplier operation 110 and addition operation 112 are performed in a consecutive matter. Next the multiplier operation 114 and addition operation 118 are performed concurrently with the read operation 116. This concurrent operation sequence continues until the last multiplication and addition operations have been completed, and the final read operation 132 is performed. In the preferred in embodiment, each block illustrates the computation of a vector operation including four separate arithmetic operations. The bracketed sections 111, 113, and 115 illustrate a loop of operations that is repeated until the final vector multiply and add operations are completed. Therefore, in this preferred embodiment the read operation 132 provides four results.

Figure 5:
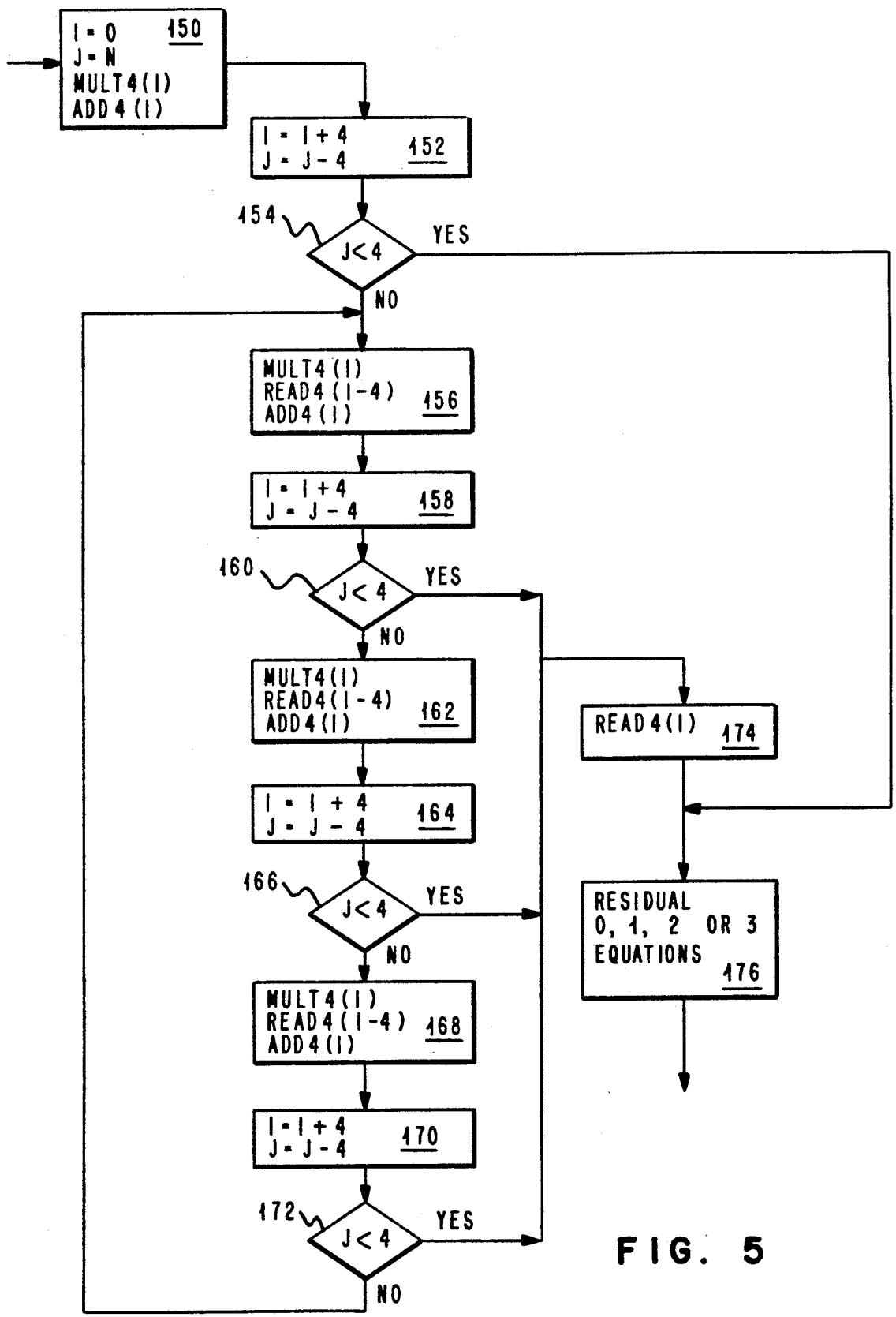
FIG. 5 is software flow diagram illustrating the vector concurrent arithmetic operations.

In this preferred embodiment, the vector concurrent process is illustrated in flow chart form in FIG. 5. In Step 150, the array index I is initialized. J which indicates the number of elements in the array on which the computation is to be performed is initialized to end. The constant K is stored in a register and the first four multiplication and addition operations are performed. In other words, the vector operations performs four overlapped multiply and addition operations where the first four elements of X are multiplied by the constant K and then added to the first four elements of the array Y. The results from each of these four operations are than placed in respective registers. In Step 152, the array index is incremented by four so that the computations on the next four elements of X and Y can proceed. J is decremented by four since the computation by four elements of X and Y have been completed. In Step 154, if the number of elements left is less than four the process proceeds to Step 156. If not, the process proceeds to Step 156.

In Step 156, four multiplication operations and four additions operations are performed consecutively. Each of the four is computed in a pipeline fashion concurrently with the reading of the previous operation results. In Step 158, the I and J counters are incremented as shown. In Step 160, if J is less than 4, the process proceeds to Step 174. If not, the process step proceeds to 162 to perform the vector arithmetic operations concurrently with the read operations. In Step 164, I and J are incremented as shown. The decision Step 166 is similar to decision Step 160. Again, in Step 168 the read operations are performed concurrently with the vector arithmetic. In Step 170, I and J are incremented and in decision Step 172, the process either loops back to Step 156 or exits to Step 174 as shown. In Step 174, the results of the previous operations are read. In Step 176, any remaining operations (remaining being less than the loop count of four) are performed in a serial fashion. While the loop in FIG. 5, Steps 162, 166, 168, 170 and 172, are repetitive and could be reduced, the expansion was provided in the preferred embodiment to reduce loop branching and thus execution time.

In Table II, the computer instructions are illustrated in Step 150, the constant K is provided to register thirty-two (R32). The vector multiply and the vector add operations are performed using the registers as shown. Likewise, Step 156, 162, and 168 include instructions as illustrated. Lastly, Step 174 includes the read of the last performed vector multiply and add operations.

FIG. 6 illustrates the flow of data into and out of the registers sixteen through thirty-two (R15-R32) during the vector arithmetic and read operations. Initially, the constant K is placed in R32 (instance 200). In register set 202, the four X values are placed in R16-R19 and the result of the computation of X times K is placed in R20-R23. In instance 204, the original Y values are placed in R24-R27 and the newly computed Y values are placed in R28-R31. In instance 206, the next four X values are placed in R16-R19 and the result of the first multiplication of the constant and the next X values are placed in R20-R23. Note that R24-R27 still contain the results from the previous sequence. In instance 208, the contents of R28-R31 containing the Y parameters are read, in other words, they are output from the register file 58 (FIG. 3) to the system bus 54. This is done concurrently with the second multiply operation illustrated as instance 206. The second vector add operation is then performed resulting in the old Y values stored in R24-R27 being used to compute the new Y values which are stored in R28-R31. The instances 208 and 210 also illustrate a hardware interlock feature that is provided to prevent the storage of new data in R28-R31 until the read of the previous data in these registers has been completed.

Figure 7A:
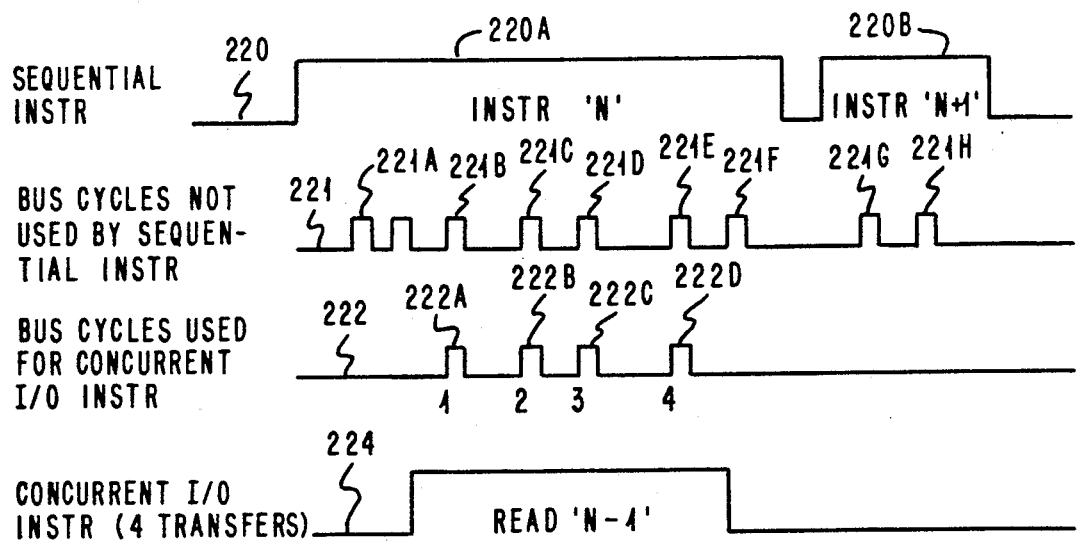
FIGS. 7A and 7B are timing diagrams illustrating the performance of concurrent operations and the occurrence of an interlock.
Figure 7B:
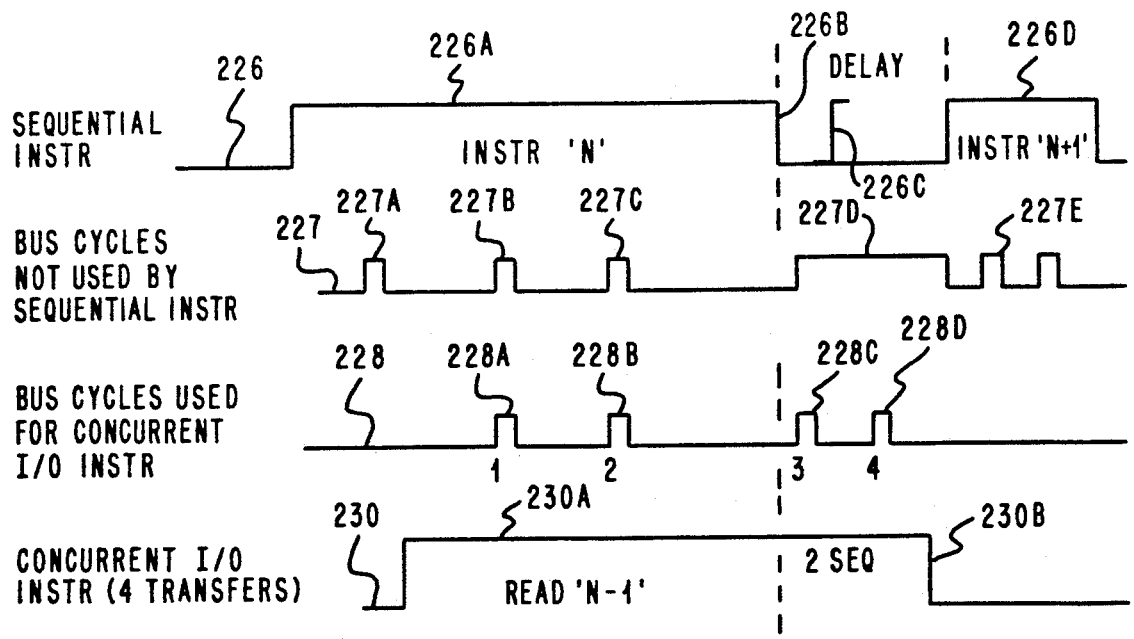

FIGS. 7A and 7B illustrates timing diagrams for the concurrent operations and the concurrent operations including an interlock. In FIG. 7A, line 220 represents the time intervals during which the Nth sequential instruction 220A and the N+1 sequential instruction 220B occurs. This waveform is provided by sequencer 100 to the I/O control unit 60 via line 86. During the start of instruction execution 220A, sequencer 100 receives a flag and data from the instruction decode unit 90. The appropriate data are provided to the ALU 64 and multiply unit 74 from the register file 58 over bus 62. The cycles of the bus 62 which are not being used by the ALU 64 and multiply unit 74 are illustrated as waveform 221. Cycles 221A to 221F represent bus cycles (for bus 62) which are not required during the execution of instruction N. These cycles are available to the I/O control unit 60 via line 86 from the sequencer 100. In this example, I/O control unit 60 accesses register file 58 during times 222A through 222D to perform the concurrent read operations for instruction N−1 during cycles 221B through 221E. In this case, the concurrent read instruction for instructor N−1 starts after the execution of sequential instruction begins, but it completes during the execution of instructor N. Since the concurrent read operation, illustrated by waveform 224, completes before the end of the sequential instruction N execution, the execution of the next sequential instruction N+1 can begin as shown.

A contrasting case is shown in FIG. 7B. In this case, the Nth sequential instruction 226A is executed as before except there are only three unused bus cycles 227A through 227C available as illustrated on waveform 227. In this example, the I/O control unit 60 starts the first concurrent read operation time 228A (waveform 228). However, since four bus cycles are required and only two concurrent read operations 228A and 228B can be completed before instruction N (226A) execution is completed, the remaining two operations 228C and 228D must be performed after the execution of instruction N is complete (time 226B). At this time, all bus cycles are available (period 227D) and the I/O control unit 60 delays or interlocks the start of the next instruction N+1 execution by asserting waveform 230A over bus 89 to instruction decode unit 92 preventing the next instruction data and flag information from being sent to the sequencer 100. At time 230B, the I/O control unit 60 relinquishes the bus 62 and the next sequential instruction N+1 begins execution (226D). This interlock is necessary because independent instruction N+1 uses the same registers (see FIG. 6) as the concurrent read instruction. If this interlock were not present, then it would be possible for the new data to be placed into R24-31 before the previous results have been read by the system, thereby causing data loss.

Figure 8:
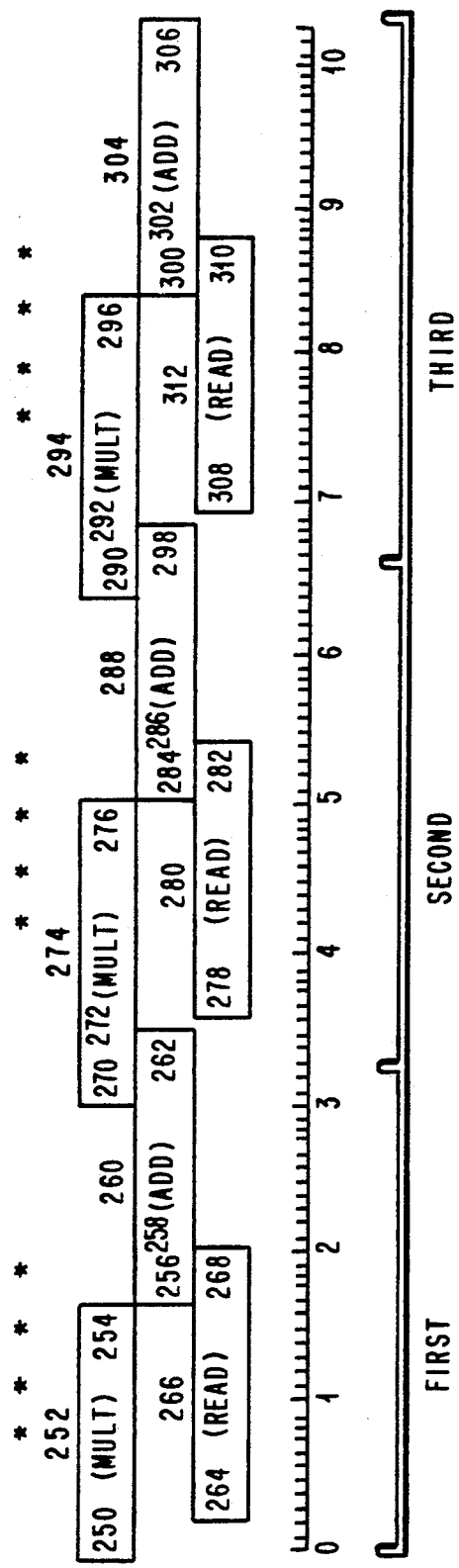
FIG. 8 is a timing diagram for the floating point unit illustrating the concurrent read, add and multiply operations.

FIG. 8 is a timing diagram illustrating the operation of the loop FIG. 5 (during the first, second, and third phases of the loop). At time 252 a multiply operation is performed. This starts at time 250 and ends at time 254 as shown. In a consecutive manner, at time 256 the add operation is performed which ends at time 262. Note that the multiply operation 274 is overlapping the completion of the add operation by starting at time 270. Concurrently with the performance of the multiply operation 252 and the queuing of the add operation 260, the read operation 266 is performed. This read operations is reading the result in R28-R31 of one of the previous multiplied and add operations. The concurrent read is performed in the matter illustrated for each next consecutive multiplier/add computation. It should be understood that each of the multiply and add operation illustrated in FIG. 8 are the vector multiply and add operations including four individual multiply operations performed in a pipeline fashion consecutively with the four vector arithmetic addition operation performed in a pipeline fashion. Therefore, each read operation is providing the content of the four registers to the system bus 54. (FIG. 3).

It is also envisioned that the I/O unit 60 can provide both read and write operations to register file 58 concurrently with add operations in ALU 64 and the multiply operations in the multiplication unit 74. This would be possible by using a dual ported access memory 58 providing operand parameters into the registers file 58 in similar way to the previously defined concurrent read operation while accessing write information through the second port.

Although this invention has been described with reference to this specific embodiment, this description is not meant to be construed in a limiting sense. Various modifications of the disclosed embodiment, as well as other embodiments to the invention, should become apparent to those persons skilled in the art upon reference to the description of this invention. It is, therefore, contemplated that the appended claims will cover any such modifications or embodiments as fall within the true scope of the invention.

We claim:

1. In a data processing system, a method for performing a series of operation sequences in a plurality of contiguous general purpose registers and an arithmetic logic unit and providing a final result to an information bus for each operation sequence, said method comprising the steps of:

assigning each of said plurality of contiguous general purpose registers to uniquely store parameters, intermediate results of operations in the sequence and a final operation sequence result;

computing results in said arithmetic logic unit for each of said sequence operations in the series consecutively;

storing results from each sequence operation in its assigned register after each sequence operation computation; and outputting to said information bus the final operation sequence result from its assigned register of a preceding sequence simultaneously with the computation of a next sequence operation result in its assigned register.

2. A method according to claim 1 wherein each operation sequence includes a plurality of arithmetic operations that are identical for the operation sequences of said series.

3. A method according to claim 2 wherein each operation result is stored in said storing step in a unique one of said registers during the computation of the sequence.

4. A method according to claim 3 wherein said step of computing results includes pipeline computing said results for a plurality of sequences operations.

5. A method according to claim 4 wherein said computing step includes the step of providing parameters to registers for the computation of sequence operation before said results of the sequence are computed.

6. A method according to claim 5 wherein said outputting step includes the step of preventing the current computation operation from accessing the register to store the final results until the results from the previous operation has been output.

7. In a data processing system, a method for performing a series of operation sequences in a plurality of contiguous general purpose registers and an arithmetic logic unit and providing a final result to an information bus for each operation sequence, said method comprising the steps of:

assigning each of said plurality of contiguous general purpose registers to uniquely store parameters, intermediate results of operations in the sequence and a final operation sequence result;

storing parameters for an initial sequence operation computation to registers assigned to store the parameters;

computing results in said arithmetic logic unit for each of said sequence operations in the series consecutively;

storing results from each sequence operation in its assigned register after each sequence operation computation; and storing parameters from said information bus for a next sequence operation computation to its assigned register simultaneously with computation of a current sequence operation result in its assigned register.

8. A method according to claim 7 wherein each operation sequence includes a plurality of arithmetic operations that are identical for the operation sequences of said series.

9. A method according to claim 5 wherein each operation result is stored in said storing step in a unique one of said registers during the computation of the sequence.

10. A method according to claim 9 wherein said step of computing results includes pipeline computing said results for a plurality of sequences operations.

11. A method according to claim 10 wherein said step of storing parameters to assigned registers for a next sequence operation includes the step of preventing the access of a register for storing said parameters until the current operation sequence operation has completed access to that register.

12. A data processing system comprising:
an information bus;
an information bus interface means for input and output of information with the information bus;
a plurality of contiguous general purpose registers;
a computational unit;
data transfer means connected to said information bus interface means, said plurality of registers and said computational unit for transferring data therebetween; and
control means connected to said information bus interface means, said plurality of registers, said computational unit, and said data transfer means for performing a current one of a series of computational sequences in said computational unit and a first portion from said plurality of registers while simultaneously outputting a result of a previous series from at least one of a second portion of said plurality of registers to said information bus.

13. A data processing system according to claim 12 wherein said control means further includes means for assigning registers of said plurality of registers to store parameters, intermediate results of operations in the sequence and a final operation sequence result, means for computing results in said computational unit for each of the series of operation sequences consecutively by computing results for each of said sequence operations in the series consecutively, means for storing results from each sequence operation in an assigned register of said plurality of registers after each operation sequence computation and means for outputting a final operation sequence result from its assigned register of a preceding sequence simultaneously during computation of a current sequence operation result.

14. A data processing system according to claim 13 wherein said control means further includes means for storing parameters for a next sequence operation computation to its assigned register of said plurality of registers during computation of a current sequence operation result.

15. A data processing system according to claim 14 wherein each operation sequence includes a plurality of arithmetic operations that are identical for the operation sequences of said series.

16. A data processing system according to claim 15 wherein said control means includes means for storing each operation result in a unique one of said registers during the computation of the sequence.

17. A data processing system according to claim 16 wherein said control means includes means for pipeline computing said results for a plurality of sequences operations in said computational unit and said plurality of registers.

18. A data processing system according to claim 17 wherein said control means includes means for storing parameters to assigned ones of said plurality of registers for the computation of sequence operation before said results of the sequence are computed.

19. A data processing system according to claim 18 wherein said control means includes means for preventing the current computation operation from accessing the register to store the final results until the results from the previous operation has been output.

20. A data processing system according to claim 19 further including a system processor means connected to said information bus for providing commands to said control means for performing said computational sequence operations.

21. A data processing system comprising:
an information bus;
an information bus interface means for input and output of information with the information bus;
a plurality of contiguous general purpose registers;
a computational unit;
data transfer means connected to said information bus interface means, said plurality of registers and said computational unit for transferring data therebetween; and
control means connected to said information bus interface means, said plurality of registers, said computational unit, and said data transfer means for performing a current one of a series of computational sequence operations in said computational unit and a first portion of said plurality of registers while storing parameters for a next sequence operation computation to a register of a second portion of said plurality of registers during computation of said current sequence operation in said computational unit.

22. A data processing system according to claim 21 wherein said control means further includes means for assigning registers of said plurality of registers to store parameters, intermediate results of operations in the sequence and a final operation sequence result, means for computing results in said computational unit for each of the series of operation sequences consecutively by computing results for each of said sequence operations in the series consecutively, means for storing results from each sequence operation in its assigned register of said plurality of registers after each sequence operation computation and means for outputting a final operation sequence result from its assigned register of a preceding sequence simultaneously during computation of a current sequence operation result.

23. A data processing system according to claim 22 wherein each operation sequence includes a plurality of arithmetic operations that are identical for the operation sequences of said series.

24. A data processing system according to claim 23 wherein said control means includes means for storing each operation result in a unique one of said registers during the computation of the sequence.

25. A data processing system according to claim 24 wherein said control means includes means for pipeline computing said results for a plurality of sequences operations in said computational unit and said plurality of registers.

26. A data processing system according to claim 25 wherein said control means includes means for storing parameters to assigned ones of said plurality of registers for the computation of sequence operation before said results of the sequence are computed.

27. A data processing system according to claim 26 wherein said control means includes means for preventing the current computation operation from accessing the register to store the final results until the results from the previous operation has been output.

28. A data processing system according to claim 27 further including a system processor means connected to said information bus for providing commands to said control means for performing said computational sequence operations.

* * * * *